United States Patent
Ding et al.

(10) Patent No.: US 12,366,472 B2
(45) Date of Patent: Jul. 22, 2025

(54) ULTRASONIC TRANSDUCER

(71) Applicants: Goldcard Smart Group Co., Ltd., Zhejiang (CN); TANCY Instrument Group Co., Ltd., Zhejiang (CN)

(72) Inventors: Yuanming Ding, Zhejiang (CN); Qian Chen, Zhejiang (CN); Xiaojian Peng, Zhejiang (CN); Hong Chen, Zhejiang (CN)

(73) Assignees: Goldcard Smart Group Co., Ltd., Zhejiang (CN); TANCY Instrument Group Co., Ltd., Zhejiang (CN)

( * ) Notice: Subject to any disclaimer, the term of this patent is extended or adjusted under 35 U.S.C. 154(b) by 180 days.

(21) Appl. No.: 18/254,538

(22) PCT Filed: Nov. 10, 2021

(86) PCT No.: PCT/CN2021/129916
§ 371 (c)(1),
(2) Date: May 25, 2023

(87) PCT Pub. No.: WO2022/142758
PCT Pub. Date: Jul. 7, 2022

(65) Prior Publication Data
US 2024/0044682 A1 Feb. 8, 2024

(30) Foreign Application Priority Data
Dec. 28, 2020 (CN) .......................... 202011600440.2

(51) Int. Cl.
*G01F 1/66* (2022.01)
*G01F 15/18* (2006.01)

(52) U.S. Cl.
CPC ............ *G01F 1/662* (2013.01); *G01F 15/185* (2013.01)

(58) Field of Classification Search
CPC .............................. G01F 1/662; G01F 15/185
See application file for complete search history.

(56) References Cited

U.S. PATENT DOCUMENTS

| 4,069,433 A | 1/1978 | McShane |
| 4,297,607 A | 10/1981 | Lynnworth et al. |
| (Continued) | | |

FOREIGN PATENT DOCUMENTS

| CN | 101097159 A | 1/2008 |
| CN | 203081535 U | 7/2013 |
| (Continued) | | |

OTHER PUBLICATIONS

International Search Report of corresponding International Application No. PCT/CN2021/129916, dated Jan. 26, 2022, 14 pages.
(Continued)

*Primary Examiner* — Francis C Gray
(74) *Attorney, Agent, or Firm* — Tucker Ellis LLP

(57) ABSTRACT

An ultrasonic transducer, including a shell, a transducer core and a tail pipe, where one end of the shell is provided with an opening, and the other end of the shell is closed; the transducer core is provided in the shell, and one end of the transducer core is closely fit and coupled to the closed end of the shell through a couplant; the tail pipe is connected to an end of the transducer core, and the tail pipe is detachably connected to the shell. The transducer is applicable to gas meters for measuring gas flow.

9 Claims, 1 Drawing Sheet

(56) References Cited

U.S. PATENT DOCUMENTS

| | | | |
|---|---|---|---|
| 4,417,480 A | 11/1983 | Zacharias, Jr. | |
| 2007/0035211 A1 | 2/2007 | Straub et al. | |
| 2007/0253582 A1* | 11/2007 | Trochesset | G10K 9/122 |
| | | | 381/190 |
| 2008/0276724 A1 | 11/2008 | Straub, Jr. et al. | |
| 2010/0249598 A1 | 9/2010 | Smith et al. | |
| 2020/0264021 A1 | 8/2020 | Stuyvenberg et al. | |

FOREIGN PATENT DOCUMENTS

| | | | |
|---|---|---|---|
| CN | 205090986 U | | 3/2016 |
| CN | 106525181 A | | 3/2017 |
| CN | 106768133 A | | 5/2017 |
| CN | 207215204 U | | 4/2018 |
| CN | 207215206 U | | 4/2018 |
| CN | 207487745 U | | 6/2018 |
| CN | 210441933 U | | 5/2020 |
| CN | 211121399 U | | 7/2020 |
| CN | 211488436 U | | 9/2020 |
| CN | 112649057 A | | 4/2021 |
| CN | 213779146 U | | 7/2021 |
| CN | 214277071 U | * | 9/2021 |
| CN | 216410288 U | * | 4/2022 |
| CN | 219038090 U | * | 5/2023 |
| CN | 219401422 U | * | 7/2023 |
| EP | 1962552 A1 | | 8/2008 |
| EP | 2146190 A1 | | 1/2010 |
| EP | 2835620 A1 | | 2/2015 |
| EP | 3444573 A1 | | 2/2019 |
| RU | 2422816 C2 | | 6/2011 |
| WO | 2015028180 A1 | | 3/2015 |

OTHER PUBLICATIONS

Office Action of corresponding Russian Application No. 2023119729/28(042670), dated Sep. 20, 2023, 9 pages.

First Office Action of corresponding Chinese Application No. 202011600440.2, dated Nov. 29, 2024, 15 pages.

Office Action of corresponding European Application No. 21913501.9, dated Oct. 16, 2024, 9 pages.

Notification to Grant Patent Right for Invention of corresponding Chinese Application No. 202011600440.2, dated Apr. 28, 2025, 6 pages.

* cited by examiner

ULTRASONIC TRANSDUCER

CROSS-REFERENCE TO RELATED APPLICATIONS

This application is a National Stage of International Application No. PCT/CN2021/129916, filed on Nov. 10, 2021, which claims priority to Chinese Patent Application No. 202011600440.2, entitled "ULTRASONIC TRANSDUCER" and filed with the China National Intellectual Property Administration on Dec. 28, 2020. Both of the above applications are incorporated hereby by reference in their entireties.

TECHNICAL FIELD

The present disclosure relates to the field of transducer technologies, and in particular, to an ultrasonic transducer.

BACKGROUND

Ultrasonic flow meters, due to their advantages such as good stability, high measurement accuracy, wide turndown ratio, low maintenance rate, low pressure loss, and easy installation, are gradually replacing traditional mechanical flow meters. Ultrasonic transducer is a core component of an ultrasonic flow meter. Quality and performance etc. of the ultrasonic transducer all affect the accuracy of measurement.

At present, no effective solution has been proposed for a problem of large storage space occupied by a laser point cloud positioning layer in the related art.

SUMMARY

In view of this, an embodiment of the present disclosure provides an ultrasonic transducer which is easily replaced.

An embodiment of the present disclosure provides an ultrasonic transducer, including a shell, a transducer core, and a tail pipe;
  one end of the shell is provided with an opening and the other end of the shell is closed, the transducer core is provided in the shell, and one end of the transducer core is closely fit and coupled to the closed end of the shell through a couplant; and
  the tail pipe is connected to an end of the transducer core, and the tail pipe is detachably connected to the shell.

According to a specific implementation of an embodiment of the present disclosure, an internal thread is provided on an inner wall, close to the opening, of the shell, and an external thread corresponding to the internal thread is provided on an outer wall of the tail pipe, the shell and the tail pipe are detachably connected through the internal thread and the external thread.

According to a specific implementation of an embodiment of the present disclosure, the transducer core includes a matching layer, a piezoelectric element, and a sound-absorbing backing;
  the piezoelectric element is cylindrical, the matching layer is provided on one end surface of the piezoelectric element, and the sound-absorbing backing is provided on the other end surface of the piezoelectric element; and
  the tail pipe is connected to the sound-absorbing backing.

According to a specific implementation of an embodiment of the present disclosure, a positive lead and a negative lead are further included, where one end of the positive lead and one end of the negative lead are respectively connected to the piezoelectric element; and
  on the sound-absorbing backing, a wire passing hole is provided along an axial direction of the sound-absorbing backing, and the other end of the positive lead and the other end of the negative lead pass through the wire passing hole and extend out from a central through-hole of the tail pipe.

According to a specific implementation of an embodiment of the present disclosure, the number of the wire passing hole is at least two, and at least two wire passing holes are distributed at intervals along a radial direction of the sound-absorbing backing.

According to a specific implementation of an embodiment of the present disclosure, a connection assembly is further included;
  the connection assembly is provided between the tail pipe and the sound-absorbing backing, and includes a rod body and an elastic member;
  the elastic member is sleeved on the rod body, one end of the rod body is provided with a stopper, one end of the elastic member abuts against the stopper, and the other end of the elastic member abuts against an end surface of the tail pipe; and
  the rod body and the stopper are respectively provided with a central through-hole which communicates with a central through-hole of the tail pipe, the stopper on the rod body is connected to the sound-absorbing backing, and an end, far away from the stopper, of the rod body is connected to the tail pipe.

According to a specific implementation of an embodiment of the present disclosure, an internal thread is provided on an inner wall of the tail pipe, an external thread is provided on an outer wall of the rod body, and the rod body is threadedly connected to the tail pipe; and
  a rotation direction of threads between the rod body and the tail pipe is opposite to a rotation direction of threads between the tail pipe and the shell.

According to a specific implementation of an embodiment of the present disclosure, the connection assembly further includes a connection plate, one end of the connection plate is connected to the sound-absorbing backing, and the other end of the connection plate is connected to the stopper on the rod body; and the connection plate is provided with a central through-hole which communicates with the central through-hole of the rod body, the central through-hole of the stopper and the central through-hole of the tail pipe;
  a boss is provided at a central position of the connection plate, an external thread is provided on an outer wall of the boss, and an internal thread is provided on a hole wall of the central through-hole of the stopper, and the boss is threadedly connected to the stopper; and
  a rotation direction of threads between the boss and the stopper is the same as a rotation direction of threads between the rod body and the tail pipe.

According to a specific implementation of an embodiment of the present disclosure, a wire passing groove is provided on an end surface, close to the sound-absorbing backing, of the connection plate.

According to a specific implementation of an embodiment of the present disclosure, at least two sealing ring grooves are provided on an outer wall of the shell.

With an ultrasonic transducer provided in embodiments of the present disclosure, when the ultrasonic transducer is damaged and needs to be repaired or replaced, the tail pipe is rotated to separate the tail pipe from the shell, and the transducer core is pulled outward to enable the transducer core to get out of the shell. This structure can implement replacement of the transducer core without disassembling the shell at the same time, rendering a simple operation, reducing the cost of replacement and maintenance, and meanwhile guaranteeing economic interests of users.

BRIEF DESCRIPTION OF DRAWINGS

The drawings described here are used to provide a further understanding of the present disclosure and constitute a part of the present disclosure. Illustrative embodiments and descriptions of the present disclosure are used to illustrate the present disclosure and do not constitute an improper limitation to the present disclosure. In the drawings.

DESCRIPTION OF EMBODIMENTS

Embodiments of the present disclosure will be described in detail below in conjunction with the accompanying drawings.

It should be clear that the described embodiments are only some of the embodiments of the present disclosure, not all of the embodiments. Based on the embodiments in the present disclosure, all other embodiments obtained by persons of ordinary skill in the art without creative efforts fall within the protection scope of the present disclosure.

Figure 1:
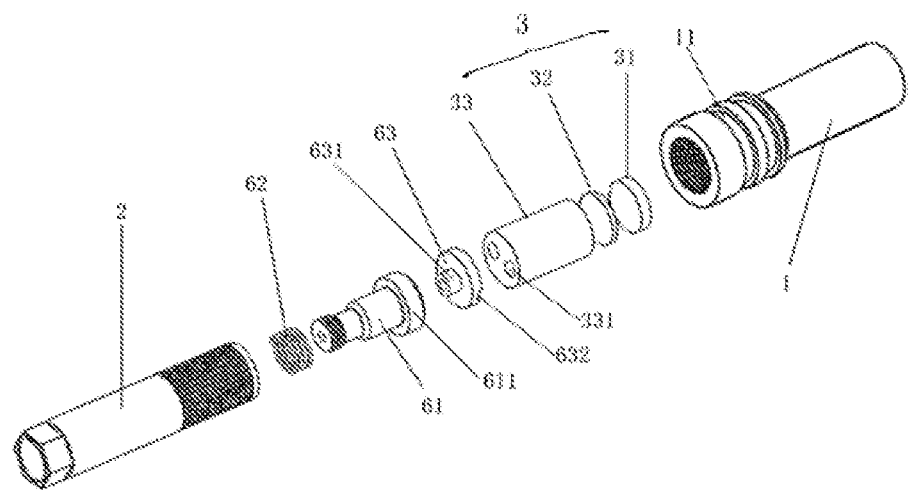
FIG. 1 is a schematic structural view of an ultrasonic transducer according to an embodiment of the present disclosure.
Figure 2:
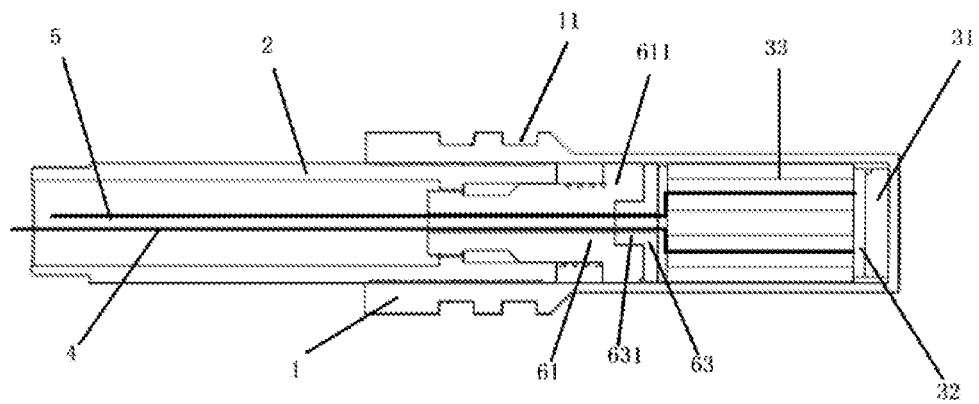
FIG. 2 is a cross-sectional diagram of an ultrasonic transducer according to an embodiment of the present disclosure.

FIG. 1 is a schematic structural diagram of an ultrasonic transducer provided by an embodiment of the present disclosure; and FIG. 2 is a cross-sectional diagram of an ultrasonic transducer provided by an embodiment of the present disclosure. As shown in FIG. 1 and FIG. 2, an embodiment of the present disclosure may include a shell 1, a transducer core 3 and a tail pipe 2.

One end of the shell 1 is provided with an opening, and the other end of the shell 1 is closed. The transducer core 3 is provided in the shell 1, and one end of the transducer core 3 is closely fit and coupled to the closed end of the shell through a couplant.

The tail pipe 2 is connected to an end of the transducer core 3, and the tail pipe 2 is detachably connected to the shell 1.

When the transducer is in normal use, the closed end of the shell of the transducer extends into a gas pipeline. When the transducer core 3 needs to be removed or replaced, the tail pipe 2 is removed from the shell 1, so that the tail pipe 2 is separated from the shell 1. Since the tail pipe 2 is in connection with the transducer core 3, the transducer core 3 can be released from the shell 1 when the tail pipe 2 is separated from the shell 1.

This structure can implement replacement of the transducer core 3 without disassembling the shell 1 at the same time, rendering a simple operation, reducing the cost of replacement and maintenance, and meanwhile guaranteeing economic interests of users. The shell 1 is coupled to the transducer core 3 by means of a couplant, not only ensuring transmission of sound waves but also realizing an operation of pulling the transducer core 3 out of the shell 1 and making replacement, thereby saving time and guaranteeing interests of users.

In the embodiment, a titanium alloy material may be employed for the shell 1, which has better anti-corrosion and pressure-resistant functions and can be better used in high-pressure gas pipelines. At the same time, the shell is prepared into a titanium alloy integrated structure by a machining process, ensuring airtightness of the transducer.

In an embodiment, an internal thread is provided on an inner wall, close to the opening, of the shell 1, and an external thread corresponding to the internal thread is provided on an outer wall of the tail pipe 2, and the shell 1 and the tail pipe 2 are detachably connected through the internal thread and the external thread. During actual production and use, a mode of the connection between the shell 1 and the tail pipe 2 is not limited to the thread connection, which is herein not specifically limited in this embodiment.

For installing the transducer core 3, it is only necessary to rotate the tail pipe 2 so that the external thread on the tail pipe 2 cooperates with the internal thread of the shell 1 to realize the installation of the transducer core 3.

Thread cooperation is adopted between the tail pipe 2 and the shell 1 to control a pretension force, ensuring that an amount of the couplant used at a front end (that is, an end away from the tail pipe 2) of the transducer core 3 is consistent, and thereby ensuring consistency of the transducer.

For removing the transducer core 3, it is only necessary to reversely rotate the tail pipe 2 to disengage the tail pipe 2 from the shell 1, and then pull the transducer core 3 out of the shell 1, rendering a convenient operation.

A length of the tail pipe 2 may be changed according to a size of a meter body and a size of an installation hole for the ultrasonic transducer, so that the transducer core 3 can be pulled out of the shell 1.

The transducer core 3 includes a matching layer 31, a piezoelectric element 32 and a sound-absorbing backing 33.

The matching layer 31, also called an acoustic matching layer 31, is a round composite material sheet made based on epoxy resin and hollow glass microspheres. The matching layer 31 can better implement acoustic matching between the piezoelectric element 32 and a gas medium and achieve high-efficiency ultrasonic transmission.

The piezoelectric element 32 is a circular columnar piezoelectric ceramic that can realize mutual conversion between electrical energy and mechanical energy, and is mainly used for transmitting and receiving ultrasonic waves.

The sound-absorbing backing 33 is a sound-absorbing structure, and serves to increase damping of a vibration system of the transducer, accelerate elimination of aftershocks in the transducer, and improve sensitivity of the ultrasonic transducer. Usually, a high attenuation and high sound absorption material is employed for the sound-absorbing backing 33.

In the embodiment, the piezoelectric element 32 is a cylindrical piezoelectric ceramic, for which a wrap-around electrode is employed. The matching layer 31 is provided on one end surface of the piezoelectric element 32, and the sound-absorbing backing 33 is provided on the other end surface of the piezoelectric element 32; and the tail pipe 2 is connected to the sound-absorbing backing 33.

Both the matching layer 31 and the sound-absorbing backing 33 may be fixed on the piezoelectric element 32 by but not limited to bonding, which is herein not specifically limited in the embodiment.

Since the matching layer 31 may fall off and be damaged during use, the shell 1 is arranged to be made of a titanium alloy, avoiding deformation and peeling of the matching layer 31 under a high pressure environment, and thus improving a service life of the ultrasonic transducer.

In an embodiment, a positive lead 4 and a negative lead 5 are further included. One end of the positive lead 4 and one end of the negative lead 5 are respectively connected to the piezoelectric element 32.

On the sound-absorbing backing 33, a wire passing hole 331 is arranged along an axial direction of the sound-absorbing backing 33. The other end of the positive lead 4 and the other end of the negative lead 5 pass through the wire passing hole 331 and extend out from a central through-hole of the tail pipe 2.

The positive lead 4 and the negative lead 5 are used for transmission of electrical signals.

In some implementations, a double-sided electrode or a wrap-around electrode may be used for the piezoelectric ceramic, which is herein not limited in the embodiment.

If a double-sided electrode is used, the positive lead 4 and the negative lead 5 are respectively led out from two end surfaces of the piezoelectric ceramic; and if a wrap-around electrode is used, both the positive lead 4 and the negative lead 5 can be led out from a rear surface of the piezoelectric ceramic (that is, a surface, close to the sound-absorbing backing 33, of the piezoelectric element 32), saving an internal space of the shell 1 of the transducer.

The number of the wire passing hole 331 is at least two, and at least two wire passing holes 331 are distributed at intervals along a radial direction of the sound-absorbing backing 33. The at least two wire passing holes 331 include a first wire passing hole 331 through which the positive lead 4 passes and a second wire passing hole 331 through which the negative wire passes. Providing at least two wire passing holes 331 facilitates saving of internal space of the transducer and improves a signal-to-noise ratio of the transducer.

In some embodiments, the wire passing hole 331 may also be provided on a side wall of the sound-absorbing backing 33, and the wire passing hole 331 runs through both end surfaces of the sound-absorbing backing 33, so that the positive lead 4 and the negative lead 5 can extend out from the side wall of the sound-absorbing backing 33.

In an embodiment, a connection assembly may be further included. A metal material is employed for the connection assembly. The connection assembly is provided between the tail pipe and the sound-absorbing backing, and includes a rod body 61 and an elastic member 62.

The elastic member 62 is sleeved on the rod body 61. One end of the rod body 61 is provided with a stopper 611 for limiting a position of the elastic member 62. One end of the elastic member 62 abuts against the stopper 611, and the other end of the elastic member 62 abuts against an end surface of the tail pipe.

The rod body 61 and the stopper 611 are respectively provided with a central through-hole which communicates with the central through-hole of the tail pipe 2. The positive lead 4 and the negative lead 5 pass through the central through-hole of the rod body 61 and the central through-hole of the stopper 611 and extend out from the central through-hole of the tail pipe 2.

The stopper 611 on the rod body 61 is connected to the sound-absorbing backing 33, and an end, away from the stopper 611, of the rod body 61 is connected to the tail pipe 2.

In order to facilitate assembly and disassembly of the tail pipe 2 and the rod body 61, an internal thread is provided on an inner wall of the tail pipe 2, and an external thread is provided on an outer wall of the rod body 61. The rod body 61 is threadedly connected to the tail pipe 2.

A rotation direction of threads between the rod body 61 and the tail pipe 2 is opposite to a rotation direction of threads between the tail pipe 2 and the shell 1, so as to prevent the tail pipe 2 from being separated from the transducer core 3 during disassembly.

In this embodiment, the elastic member 62 may be a spring, and an outer diameter of the spring is smaller than an outer diameter of the tail pipe. The provision of the spring which is used to control a fastening force during installation has certain buffering effect in installing the transducer core 3, and fragmentation of piezoelectric ceramic caused by hard contact during positioning is thus avoided.

In one embodiment, the connection assembly further includes a connection plate 63. A plastic insulating material is employed for the connection plate 63. One end of the connection plate 63 is connected to the sound-absorbing backing 33, and the other end of the connection plate 63 is connected to the stopper 611 on the rod body 61. The connection plate is provided with a central through-hole which communicates with the central through-hole of the rod body, the central through-hole of the stopper and the central through-hole of the tail pipe. The connection plate 63 and the sound-absorbing backing 33 may be bonded but not limited to be bonded, which is herein not limited in the embodiment.

A boss 631 is provided at a central position of the connection plate 63. An external thread is provided on an outer wall of the boss 631, and an internal thread is provided on a hole wall of the central through-hole of the stopper 611, and the boss 631 is threadedly connected to the stopper 611.

A rotation direction of threads between the boss 631 and the stopper 611 is the same as a rotation direction of threads between the rod body 61 and the tail pipe 2.

With the provided connection plate 63, when the transducer core 3 needs to be replaced, the rod body 61 can be recycled after being pulled out without damaging the rod body 61, and only the connection plate 63 needs to be replaced, which saves cost and is convenient for maintenance.

In order to make a bonding surface between the connection plate 63 and the sound-absorbing backing 33 more even, a wire passing groove 632 is provided on an end surface, close to the sound-absorbing backing 33, of the connection plate 63. The wire passing groove 632 is used for placing the positive lead 4 and the negative lead 5 extending out from the sound-absorbing backing 33.

In an embodiment, at least two sealing ring grooves 11 are provided on an outer wall of the shell 1. During actual production and use, fittings may be flexibly designed according to sizes and dimensions of different gas meter bodies to realize installation and use without the need to modify and process the size of the shell 1 of the transducer.

The ultrasonic transducer provided by the embodiment of the present disclosure can be disassembled under pressure when the transducer core 3 fails, and at the same time, the transducer core 3 can be pulled out for replacement without disassembling the shell, reducing maintenance costs and meanwhile protecting economic interests of users.

It should be noted that solutions described in the various embodiments herein focus on different aspects, but there is a certain interrelated relationship between the various embodiments. References may be made to each other among the various embodiments to understand the solutions of the present disclosure. Additionally, relational terms such as first and second, etc., are used only to distinguish one entity or operation from another entity or operation without necessarily requiring or implying any such actual relationship or sequence existing between the entities or operations. Furthermore, the terms "comprise", "include" or any other variants thereof are intended to cover non-exclusive inclusion such that a process, a method, an article, or a device including a set of elements includes not only those elements, but also includes other elements not expressly listed, or also include elements inherent in such a process, a method, an article, or a device. In the case of no further limitations, an element defined by the phrase "including a . . . " does not exclude the presence of additional identical elements in a process, a method, an article, or a device including the element.

The above descriptions are only illustrative of specific embodiments of the present disclosure, but the protection scope of the present disclosure is not limited thereto. Changes or substitutions that can be easily thought of by any skilled in the art within the technical scope disclosed in the present disclosure should all fall within the protection scope of the present disclosure. Therefore, the protection scope of the present disclosure should be subject to the protection scope of the claims.

The invention claimed is:

1. An ultrasonic transducer, comprising:
a shell, a transducer core and a tail pipe;
wherein one end of the shell is provided with an opening and the other end of the shell is closed, the transducer core is provided in the shell, and one end of the transducer core is closely fit and coupled to the closed end of the shell through a couplant; and
the tail pipe is connected to an end of the transducer core, and the tail pipe is detachably connected to the shell;
wherein an internal thread is provided on an inner wall, close to the opening, of the shell, and an external thread corresponding to the internal thread is provided on an outer wall of the tail pipe, the shell and the tail pipe are detachably connected through the internal thread and the external thread.

2. The ultrasonic transducer according to claim 1, wherein the transducer core comprises a matching layer, a piezoelectric element and a sound-absorbing backing;
wherein the piezoelectric element is cylindrical, the matching layer is provided on one end surface of the piezoelectric element, and the sound-absorbing backing is provided on the other end surface of the piezoelectric element; and
the tail pipe is connected to the sound-absorbing backing.

3. The ultrasonic transducer according to claim 2, further comprising a positive lead and a negative lead, wherein one end of the positive lead and one end of the negative lead are respectively connected to the piezoelectric element; and
on the sound-absorbing backing, a wire passing hole is provided along an axial direction of the sound-absorbing backing, and the other end of the positive lead and the other end of the negative lead pass through the wire passing hole and extend out from a central through-hole of the tail pipe.

4. The ultrasonic transducer according to claim 3, wherein the number of the wire passing hole is at least two, and at least two wire passing holes are distributed at intervals along a radial direction of the sound-absorbing backing.

5. The ultrasonic transducer according to claim 2, further comprising a connection assembly;
wherein the connection assembly is provided between the tail pipe and the sound-absorbing backing, and includes a rod body and an elastic member;
wherein the elastic member is sleeved on the rod body, one end of the rod body is provided with a stopper, one end of the elastic member abuts against the stopper, and the other end of the elastic member abuts against an end surface of the tail pipe; and
wherein the rod body and the stopper are respectively provided with a central through-hole which communicates with a central through-hole of the tail pipe, the stopper on the rod body is connected to the sound-absorbing backing, and an end, far away from the stopper, of the rod body is connected to the tail pipe.

6. The ultrasonic transducer according to claim 5, wherein an internal thread is provided on an inner wall of the tail pipe, an external thread is provided on an outer wall of the rod body, and the rod body is threadedly connected to the tail pipe; and
wherein a rotation direction of threads between the rod body and the tail pipe is opposite to a rotation direction of threads between the tail pipe and the shell.

7. The ultrasonic transducer according to claim 5, wherein the connection assembly further comprises a connection plate, one end of the connection plate is connected to the sound-absorbing backing, and the other end of the connection plate is connected to the stopper on the rod body; and the connection plate is provided with a central through-hole which communicates with the central through-hole of the rod body, the central through-hole of the stopper and the central through-hole of the tail pipe;
wherein a boss is provided at a central position of the connection plate, an external thread is provided on an outer wall of the boss, and an internal thread is provided on a hole wall of the central through-hole of the stopper, and the boss is threadedly connected to the stopper; and
wherein a rotation direction of threads between the boss and the stopper is the same as a rotation direction of threads between the rod body and the tail pipe.

8. The ultrasonic transducer according to claim 7, wherein a wire passing groove is provided on an end surface, close to the sound-absorbing backing, of the connection plate.

9. The ultrasonic transducer according to claim 1, wherein at least two sealing ring grooves are provided on an outer wall of the shell.

* * * * *